Patented Feb. 27, 1934

1,949,398

UNITED STATES PATENT OFFICE 1,949,398

WELDING ROD

John B. Austin, East Cleveland, Ohio, assignor to Una Welding, Inc., Cleveland, Ohio, a corporation of Delaware No Drawing. Application May 19, 1930
Serial No. 453,619

8 Claims. (Cl. 219—8)

This invention relates to welding, and more particularly to an improved binder for securing fluxing material to a welding electrode.

In the welding art, particularly in electric arc welding, it is common practice to dispose on a welding rod fluxing material to modify or improve the welding characteristics of the electrode or to effect an alloying reaction. Such coatings have been secured to the metal rod by binders of various kinds.

One of the commonest binders employed has been silicate of soda. Such silicate, while it seems to improve the action of the arc, tends to deposit a slag upon the weld metal. This effect is frequently marked and undesirable when the silicate is used as a binder for a coating of appreciable thickness. Furthermore, silicate of soda is not a particularly strong binder for use in causing adherence to the metallic surface of a welding rod. It is well known that electrode coatings with silicate as a binder tend to become brittle and flake off. Furthermore, such coatings must be carefully packed to avoid deterioration and flaking off during transportation.

Shellacs and varnishes made from gums and resins have also been employed to some extent as binders for electrode coatings. Such binders are advantageous in that by the use thereof coated electrodes may be formed in which the coatings adhere very firmly and substantially permanently to the rod metal. Furthermore, coated electrodes employing such binders may be readily transported without danger of damaging the coating. Such shellac or varnish binders are disadvantageous, however, in that they confer undesirable arc welding properties upon the electrode, such as, for example, arc instability. Furthermore, such binders produce a heavy, tough slag on the weld metal which is frequently undesirable.

Objects of this invention are to provide a binder for coated electrodes which will not confer undesirable welding characteristics upon the electrode and which will secure the coating to the rod metal in firm fashion. Another object is to provide a coated electrode which may be readily handled and transported without danger of removal of the coating.

Other objects of the invention will be apparent to those skilled in the art from the disclosures herein made.

I have found that a lacquer made from a cellulose derivative, for example nitrocellulose, makes an admirable binder material for securing an electrode coating to the surface of a metal rod. With such binder an electrode coating may be firmly secured to a welding rod and furthermore practically no slag is deposited from such binder upon weld metal. Furthermore, such binder does not detract from the welding properties of the electrode as does the shellac and varnish binders mentioned above. Such cellulose derivative lacquers ordinarily comprise nitrocellulose or related materials dissolved in a suitable organic solvent, such as acetone. The commercial article known as pyroxylin lacquer is one example of a nitrocellulose lacquer such as contemplated by this invention.

An electrode coating may be secured to a welding rod by the cellulose derivative lacquer in any one of various ways. For example, a suspension may be formed of comminuted coating material and the cellulose derivative lacquer, and the mixture suitably applied to a rod, for example, by dipping said rod therein or by brushing the mixture upon the rod. Furthermore the coating might be applied by disposing the lacquer on the surface of the bare rod and dusting comminuted coating material upon a wet binder, or by dipping the binder coated rod into the coating material. Also, a suspension containing the binder might be sprayed upon the surface of a rod. Other methods of application may be employed, the invention not being limited to any particular method.

It is obvious, of course, that the binder might be employed to secure a non-comminuted coating to a rod, for example, paper, yarn, or other coating materials. The invention is, of course, not limited to any particular form or composition of coating material.

While I am not certain of the exact mechanism involved, the advantageous properties of a cellulose derivative lacquer as a binder appear to be due to the fact that upon combustion in the arc the cellulose derivative lacquer leaves no products, such as gummy products, to form an undesirable slag. In other words, the products of the combustion of the cellulose derivative lacquer in the arc appear in the main to be gaseous and of such a character as not disadvantageously to affect the arc. Furthermore, the combustion of the lacquer appears to form gases which tend to protect the molten weld metal from oxidation.

It will thus be seen that in the use of cellulose derivative lacquer as an electrode coating binder, I have discovered a binder which is exceedingly adherent to metal and yet which does not disadvantageously affect the action of the arc during the operation of welding with the electrode.

Furthermore, it is to be understood that the particular compounds disclosed, and the procedure set forth are presented for purposes of explanation and illustration and that various equivalents can be used and modifications of said procedure can be made without departing from my invention as defined in the appended claims.

What I claim is:

1. A coated welding electrode comprising a metal rod and a coating secured thereto by means of a nitrocellulose lacquer, said coating being substantially free from inorganic binding agents.

2. A welding rod comprising, in combination, a metal rod, coating material and a binder of nitrocellulose lacquer securing said coating material to said rod, said coating being substantially free from inorganic binding agents.

3. A welding electrode comprising, in combination, a metal rod and comminuted coating material disposed on said rod, the particles of said coating material being caused to adhere to each other and to said rod by a nitrocellulose lacquer, said coating being substantially free from inorganic binding agents.

4. A welding electrode comprising, in combination, a metal rod, comminuted coating ingredients disposed on the surface of said rod, and a nitrocellulose lacquer contacting directly with the surface of said rod and with the individual particles of said coating ingredients to secure said coating ingredients firmly to the rod said coating ingredients being substantially free from binding agents which produce more than an appreciable amount of slag during the welding operation.

5. A welding electrode comprising, in combination, a metal rod, coating material associated with said rod, and material of the pyroxylin type contacting directly with the metallic surface of said rod and with said coating material and holding said coating material firmly in association with said rod, said coating material being substantially free from binding agents which produce more than an appreciable amount of slag during the welding operation.

6. A welding electrode comprising, in combination a metal rod and a coating disposed on said rod comprising a fluxing material and a pyroxylin lacquer binding material holding the fluxing material in firm relationship with said rod, said coating being substantially free from binding agents which produce more than an appreciable amount of slag during the welding operation.

7. A welding electrode comprising, in combination, a metal rod and a coating disposed on said rod comprising powdered ingredients and a binding agent comprising a pyroxylin lacquer material to cause the particles to adhere in firm relationship with said rod, said coating being substantially free from binding agents which produce more than an appreciable amount of slag during the welding operation.

8. A welding electrode comprising, in combination, a metal rod and a coating disposed on the surface of said rod, said coating comprising powdered or granulated fluxing material of non-binding properties and a binder of the pyroxylin type serving to hold said fluxing material in firm association with said rod, said coating being substantially free from binding agents which will produce more than an appreciable amount of slag during the welding operation.

JOHN B. AUSTIN.